US006232964B1

(12) United States Patent
Lee

(10) Patent No.: US 6,232,964 B1
(45) Date of Patent: May 15, 2001

(54) POWER CONTROL CIRCUIT FOR DISPLAY DEVICE HAVING PFC FUNCTION

(75) Inventor: Joo-hyoung Lee, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/145,289

(22) Filed: Sep. 2, 1998

(30) Foreign Application Priority Data

Sep. 2, 1997 (KR) .................................................. 97-45465

(51) Int. Cl.[7] ....................................................... G09G 5/00
(52) U.S. Cl. ............................................. 345/212; 345/211
(58) Field of Search ................................... 345/211, 212, 345/214; 363/21; 323/303; 315/1

(56) References Cited

U.S. PATENT DOCUMENTS

| | | | |
|---|---|---|---|
| 5,576,941 | * 11/1996 | Nguyen et al. | 363/21 |
| 5,705,891 | * 1/1998 | Ishida et al. | 315/1 |
| 5,801,522 | * 9/1998 | McKenzie | 323/303 |
| 5,905,491 | * 5/1999 | Kim | 345/212 |

* cited by examiner

Primary Examiner—Steven Saras
Assistant Examiner—Alecia D. Nelson
(74) Attorney, Agent, or Firm—Staas & Halsey LLP

(57) ABSTRACT

A power control circuit of a display device having a power factor correction (PFC) function includes a microcomputer to determine a display power management signaling (DPMS) mode of the display device by discriminating a sync signal input from a host computer; a rectifier to output DC power by rectifying an AC power input; a PFC controller, having a pulse width modulation (PWM) circuit, to output a PWM signal according to the DPMS mode determined by the microcomputer, the PFC controller receiving the DC power output of the rectifier; a PFC power circuit, using a DC current from the rectifier, to generate a power-factor-corrected power output based on the PWM signal output from the PFC controller; and a frequency-controlled oscillator to supply the PWM circuit of the PFC controller with a predetermined oscillation signal. The frequency-controlled oscillator includes frequency-controlling elements such as capacitors selectively activated according to the DPMS mode determined by the microcomputer; and an isolation device such as an optical coupler, connected between the microcomputer and at least one of the frequency-controlling elements, to provide electrical isolation between the activated frequency-controlling element and the microcomputer. The microcomputer includes at least one output port outputting a DPMS mode signal based on the determined DPMS mode. The microcomputer outputs a first DPMS mode signal when the determined DPMS mode is a normal mode or a standby mode and outputs a second DPMS mode signal when the determined DPMS mode is a suspend mode or a power-off mode. The power control circuit does not cut off the DC power input to the PFC control circuit and maintains proper PFC control throughout the stages of DPMS operation.

18 Claims, 4 Drawing Sheets

POWER CONTROL CIRCUIT FOR DISPLAY DEVICE HAVING PFC FUNCTION

CROSS-REFERENCE TO RELATED APPLICATIONS

This application makes reference to, incorporates the same herein, and claims all benefits accruing under 35 U.S.C. §119 from my application entitled Power Control Device for Display Device Having PFC Function filed with the Korean Industrial Property Office on Sep. 2, 1997 and duly assigned Serial No. 97-45465 by that Office.

BACKGROUND OF THE INVENTION

1. Field of the Invention

The present invention relates to a computer display device (monitor) and, more particularly, to a power control circuit for such a display device, which utilizes a frequency-controlled oscillator in order to implement a power factor correction (PFC) function while the display device is in a display power management signaling (DPMS) mode.

2. Description of the Related Art

A display device for use with a personal computer is generally manufactured with internal control means for reducing power consumption in accordance with, for example, the DPMS standard. In conformity with the DPMS standard, a host computer, which typically includes a video card, selectively supplies (or blocks) horizontal and vertical sync signals to the display device according to the computer's state of use, which is continually monitored in order to conserve power. Thus, a DPMS function enables the display device to manage its power distribution according to the presence (or absence) of the video sync signals. The power management states are classified into an "on" (normal) state, a standby state, a suspend state and a power-off state.

| DPMS | sync signal applied | |
|---|---|---|
| state | horizontal | vertical |
| on | yes | yes |
| standby | no | yes |
| suspend | yes | no |
| off | no | no |

As shown in the above table, both the horizontal and vertical sync signals are applied to the display device in the "on" state, only the vertical sync signal is applied in the standby state, only the horizontal sync signal is applied in the suspend state, and neither sync signal is applied in the power-off state. Starting in the normal mode, the DPMS state converts, in sequence, first to the standby mode, then to the suspend mode, and finally to the power-off mode, according to a time lapse corresponding to the lack of use of the computer system. In the normal operation mode, a monitor is fully supplied with electric power, while in the stand-by and suspend modes, the display is selectively muted (blanked) to reduce power. In the power-off mode, the supply of power for the monitor is cut off.

Meanwhile, a contemporary display device employs a rectifying circuit to obtain a DC supply power for internal use by rectifying a general-purpose AC voltage. Such a rectifying circuit, however, does not correct for a loss of power incurred due to a phase difference existing between the current and the voltage output by the rectifying circuit. This phase difference is known as a power factor. Therefore, a power factor correction (PFC) circuit is typically employed and a conventional power control circuit for a display device, as shown in FIG. 1, includes such circuitry.

Referring to FIG. 1, the conventional circuit includes a microcomputer 10 receiving horizontal (H_SYNC) and vertical (V_SYNC) sync signals from a computer main body (not shown) to discriminate a DPMS mode and outputting a control signal to implement a DPMS mode based on the discriminated mode; a rectifier 20 outputting DC power by a full-wave rectification of a general-purpose AC power input to the display device; a power switch 30 selectively applying the output power of the rectifier based on the mode signal output from the microcomputer; a PFC controller 40, which includes an internal pulse width modulation (PWM) circuit, generating a PWM signal and functioning according to the operation of the power switch 30; a PFC power circuit 50 using a DC current from the rectifier 20 to generate a power-factor-corrected power output based on the PWM signal output from the PFC controller 40; a transformer T1 limiting the DC output of the rectifier in accordance with the operation of the PFC power circuit 50; and a microcomputer power supply 60 supplying the microcomputer 10 with uninterrupted electrical power, e.g., 5VDC, which is induced via a winding of the transformer's secondary and then rectified by a diode D1 and charged in a capacitor C1.

In the PFC power circuit 50, a field-effect transistor (FET) Q1 connected between a drain resistor R1 and a source resistor R3 is switched by the PWM output signal of the PFC controller 40, which is fed to the gate terminal of the FET Q1 through a gate resistor R2. A feedback current from the source terminal of the FET Q1 is supplied to a current detection terminal in the PFC controller 40. Thus, a PFC power output is generated through a rectifying diode D2 and a charging capacitor C2.

In the "on" (normal) mode of DPMS operation of a display device incorporating the above power control circuit, the microcomputer 10 receives both the horizontal (H_SYNC) and vertical (V_SYNC) sync signals from a host computer and outputs a mode signal, e.g., a logic high, which enables the PFC function by turning on (closing) the power switch 30 and thereby powering the PFC controller 40. In doing so, the PFC controller 40 outputs a PWM signal as shown in FIG. 2A, which produces a power-factor-corrected output from the PFC power circuit 50.

However, in a power savings mode such as standby, suspend or off, the PFC function is disabled since the PWM output signal of the PFC controller 40 is inappropriate for a reduced power consumption state. That is, in any power savings mode of DPMS operation of a display device incorporating the above power control circuit, the microcomputer 10 does not receive both sync signals and outputs a mode signal, e.g., a logic low, which disables the PFC function by turning off (opening) the power switch 30 and thereby cutting off the power to the PFC controller 40. In doing so, the output of the PFC controller 40, being disabled as shown in FIG. 2B, does not switch the FET Q1 and the power factor of the output of the PFC power circuit 50 is not corrected.

Accordingly, in the conventional art, the PFC function of the power control circuit of a display device is inoperative in DPMS modes such as standby, suspend and off. Therefore, a power control circuit which allows for power factor correction of the power supply of a display device in all states of DPMS operation is needed.

SUMMARY OF THE INVENTION

Accordingly, in order to overcome such drawbacks in the conventional art, it is therefore an object of the present invention to provide a power control circuit for a display device in which a PFC function can be implemented even in any DPMS mode of the display device.

It is another object of the present invention to provide a power control circuit for a display device, which uses a DPMS mode signal output of a microcomputer to control an oscillating frequency of a PFC control circuit by varying a frequency-controlling property, e.g., a capacitance.

It is yet another object of the present invention to provide a power control circuit for a display device, which selects a frequency-controlling element, e.g., a capacitor, according to a DPMS mode signal output of a microcomputer in order to control an oscillating frequency of a PFC control circuit.

Additional features and advantages of the invention will be set forth in the description which follows and, in part, will be apparent from the description, or may be learned through practice of the invention.

To achieve these objects and other advantages and in accordance with the purpose of the present invention, as embodied and broadly described, there is provided a power control circuit for use in a display device having a PFC function, including a microcomputer to determine a DPMS mode of the display device by discriminating a sync signal input from a host computer; a rectifier to output DC power by rectifying an AC power input; a PFC controller, having a PWM circuit, to output a PWM signal according to the DPMS mode determined by the microcomputer, the PFC controller receiving the DC power output of the rectifier; a PFC power circuit, using a DC current from the rectifier, to generate a power-factor-corrected power output based on the PWM signal output from the PFC controller; and a frequency-controlled oscillator to supply the PWM circuit of the PFC controller with a predetermined oscillation signal.

The power control circuit according to the present invention does not cut off the DC power input to the PFC control circuit and maintains proper PFC control throughout the stages of DPMS operation.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols represent the same or similar components, wherein.

DETAILED DESCRIPTION OF THE PREFERRED EMBODIMENT

Reference will now be made in detail to the preferred embodiments of the present invention, examples of which are illustrated in the accompanying drawings. The embodiments are described below in order to explain the present invention by referring to the figures.

Figure 1:
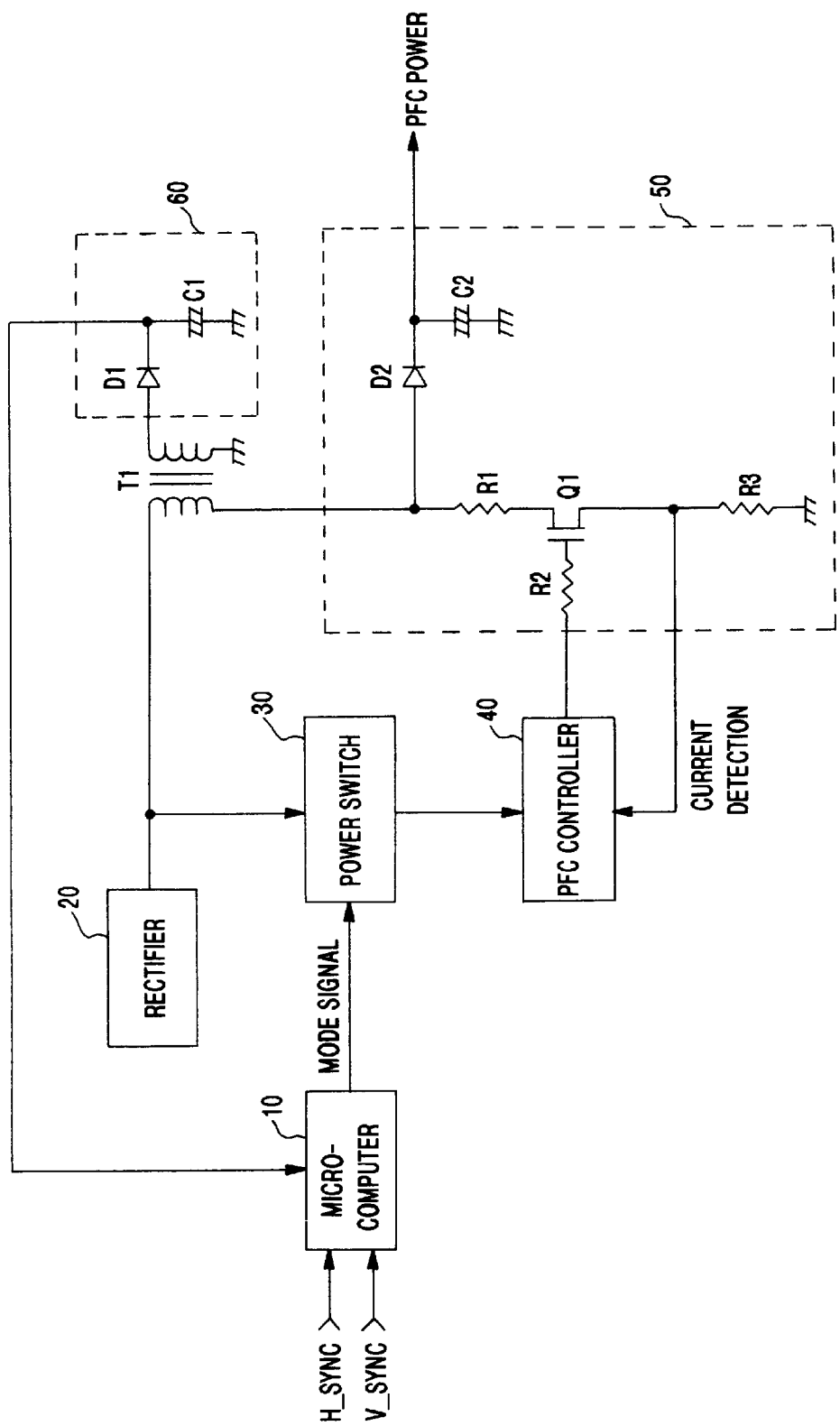
FIG. 1 is a schematic diagram of a power control circuit of a display device having a PFC function, according to the conventional art.
Figure 2A:
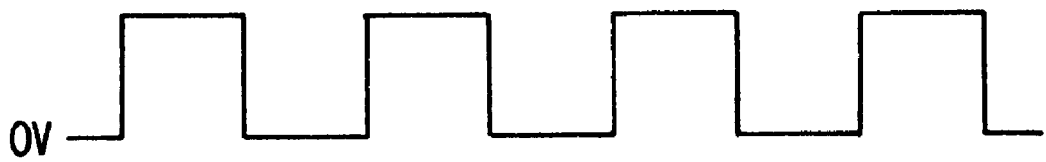
FIGS. 2A and 2B are diagrams showing sample waveforms of the input signal to the PFC power circuit of FIG. 1, in a normal DPMS mode and a power savings DPMS mode, respectively.
Figure 2B:
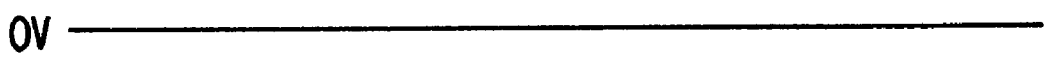
Figure 3:
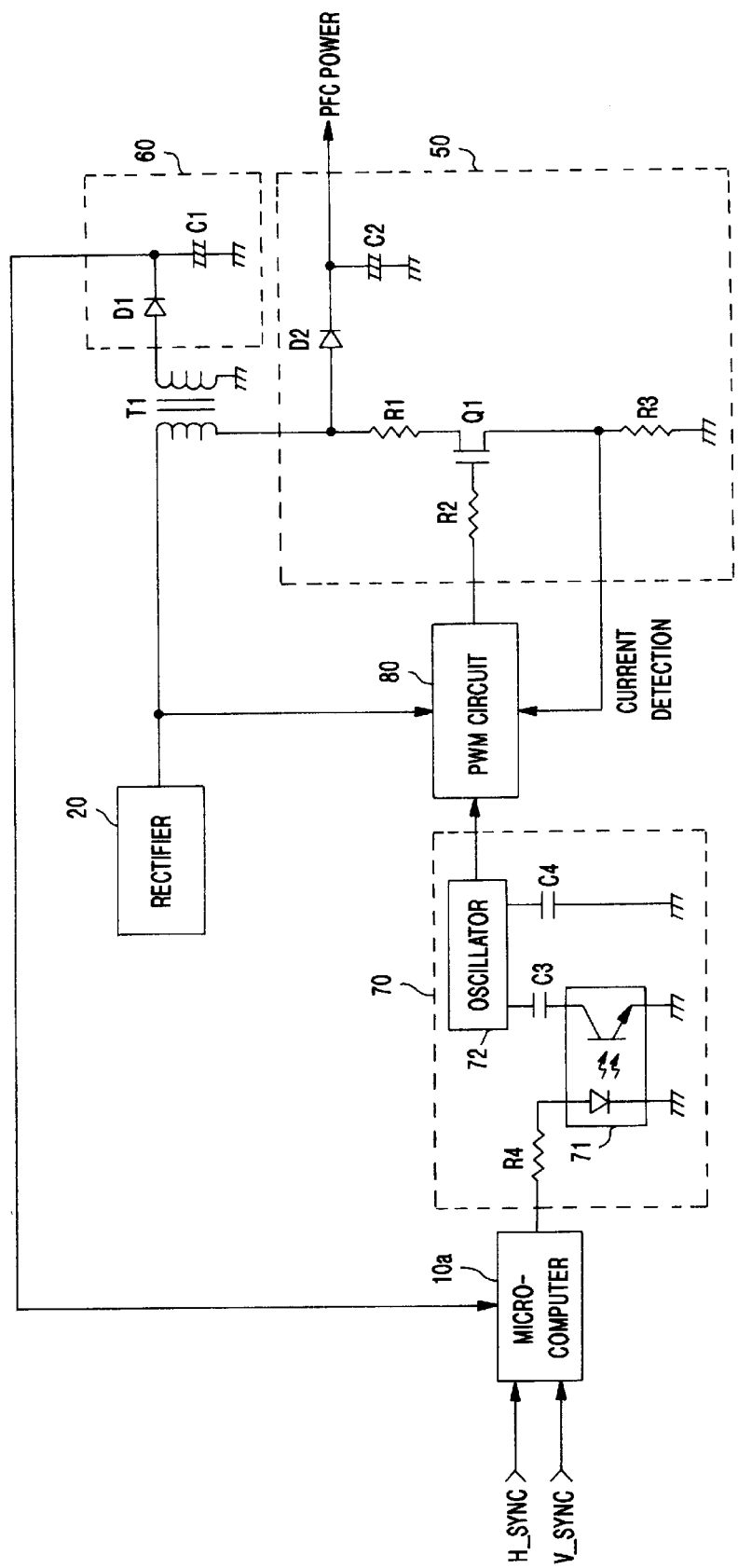
FIG. 3 is a schematic diagram of a power control circuit for a display device having a PFC function, according to an embodiment of the present invention.

Referring to FIG. 3, besides elements of the conventional circuit (e.g., rectifier 20, PFC power circuit 50, transformer T1, microcomputer power supply 60, etc.), the circuit according to an embodiment of the present invention includes a frequency-controlled oscillator 70 which supplies a PWM circuit 80 such as that included in the PFC controller 40 of the conventional circuit with a predetermined oscillation signal according to a DPMS mode signal output of a microprocessor 10a. In a preferred embodiment of the present invention, the frequency-controlled oscillator 70 includes an optical coupler 71, which performs a switching operation for selectively activating/deactivating (electrically connecting/disconnecting) a frequency-controlling element, e.g., a capacitor, according to the status of a DPMS mode signal output of the microcomputer 10a via a series resistor R4, to thereby control the frequency of an oscillator 72.

In the operation of the power control circuit according to the embodiment of the present invention, uninterrupted power is provided to the PWM circuit 80 from the rectifier 20. Thus, continuous circuit effectiveness is provided throughout each stage of DPMS operation, i.e., the normal mode, standby mode, suspend mode and power-off mode.

Figure 4A:
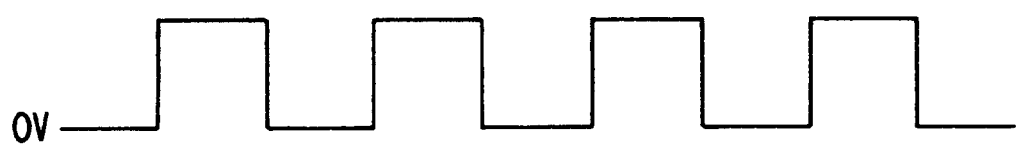
FIGS. 4A and 4B are diagrams showing sample waveforms of the input signal to the PFC power circuit of FIG. 3, in a first DPMS mode and a second DPMS mode, respectively.

In a first mode of DPMS operation of a display device adopting the power control circuit according to the embodiment of the present invention, the microcomputer 10a outputs a first mode signal for selecting a first frequency of the oscillator 72. In the embodiment, the first DPMS mode corresponds to the normal or standby mode, whereby a logic "low" mode signal output of the microcomputer 10a deactivates a second capacitor C3 (or in other words, electrically disconnects the second capacitor C3 from the oscillator 72), while the activation (elecrtical connection) of a first capacitor C4 is maintained. With just one of the capacitors C3 and C4 in the circuit, the oscillator 72 generates a relatively high frequency for output to the PWM circuit 80. Using this higher frequency input, the PWM circuit 80 outputs a PWM signal of a relatively high duty ratio (duty cycle) as shown in FIG. 4A, to produce a power-factor-corrected output from the PFC power circuit 50, which is appropriate for higher power consumption states such as the normal and standby DPMS modes.

Figure 4B:
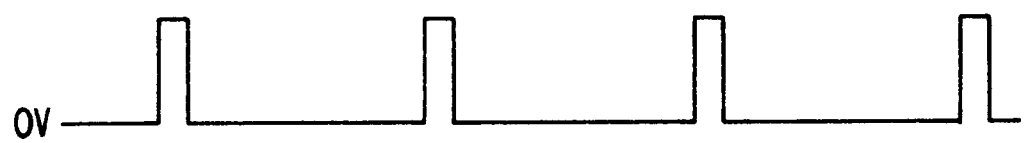

In a second mode of DPMS operation of the display device adopting the power control circuit according to the embodiment of the present invention, the microcomputer 10a outputs a second mode signal for selecting a second frequency of the oscillator 72. In the embodiment, the second DPMS mode corresponds to the suspend or power-off mode, whereby a logic "high" mode signal output of the microcomputer 10a activates the second capacitor C3 (or in other words, electrically connects the second capacitor to the oscillator 72) in conjunction with the first capacitor C4. With both of the capacitors C3 and C4 in the circuit, the oscillator 72 generates a relatively low frequency for output to the PWM circuit 80. Using this lower frequency input, the PWM circuit 80 outputs a PWM signal of a relatively low duty ratio (duty cycle) and increased period, as represented by FIG. 4B, to produce a power-factor-corrected output from the PFC power circuit 50, which is appropriate for lower power consumption states such as the suspend and power-off DPMS modes.

The optical coupler 71 serves as isolation means while performing a simultaneous switching operation for activating the second capacitor C3 (eletrically connecting the second capacitor to the oscillator 72), to minimize the effects of stray capacitance. However, any switching device having similar isolating properties can be used.

It should be appreciated that, by using the above-described technique, the microcomputer 10a may be provided with additional DPMS mode output ports for the selective activating (electrically connecting) of additional frequency-controlling elements, so that additional oscillation frequencies may be obtained. Thus, an appropriate power factor correction can be provided for any number of DPMS states.

Also, though the described embodiment of the present invention uses passive components (i.e., capacitors) to select an oscillation frequency for a predetermined setting of power factor correction, the microcomputer 10a may be alternatively provided with an internal digital-to-analog converter to generate an analog output instead of discrete mode states. Thus, a variable oscillation frequency control may be realized using an active component such as a varacter diode for precise PFC operation for any desired power output condition. The control gate of the varacter diode would be connected to resistor R4 and the anode and cathode terminals would be connected between the oscillator and ground, with the necessary reverse biasing determined according to the ramp output of the microcomputer's digital-to-analog-computer.

As explained above, by adopting the power control circuit of the present invention in which a frequency-determining component of an oscillator is controlled according to the DPMS mode signal output of a microcomputer to vary the operating frequency of a PFC control circuit, proper levels of power factor correction can be maintained for any number of DPMS states. Thus, the PFC function of a computer display device can be implemented even in any DPMS mode of the display device, including a power-saving mode of the DPMS operation.

It will be apparent to those skilled in the art that various modifications can be made in the power control circuit for a display device having a PFC function of the present invention, without departing from the spirit of the invention. Thus, it is intended that the present invention cover such modifications as well as variations thereof, within the scope of the appended claims and their equivalents.

What is claimed is:

1. A power control circuit for use in a display device having a power factor correction (PFC) function, comprising:
    a microcomputer to determine a display power management signaling (DPMS) mode of the display device by discriminating a sync signal input from a host computer, to generate a DPMS mode signal;
    a rectifier to output DC power by rectifying an AC power input;
    a PFC controller, having a pulse width modulation (PWM) circuit, to output a PWM signal according to the DPMS mode signal determined by said microcomputer, said PFC controller receiving the DC power output of said rectifier;
    a PFC power circuit, using a DC current from said rectifier, to generate a power-factor-corrected power output based on the PWM signal output from said PFC controller; and
    a frequency-controlled oscillator to supply the PWM circuit of said PFC controller with an oscillation signal based upon the DPMS mode signal.

2. The circuit as claimed in claim 1, wherein said frequency-controlled oscillator comprises a plurality of frequency-controlling elements selectively activated according to the DPMS mode determined by said microcomputer.

3. The circuit as claimed in claim 2, wherein said plurality of frequency-controlling elements is made up of capacitors.

4. The circuit as claimed in claim 2, wherein said frequency-controlled oscillator further comprises an isolation device, connected between said microcomputer and at least one of said plurality of frequency-controlling elements, to provide electrical isolation between the activated frequency-controlling element and said microcomputer.

5. The circuit as claimed in claim 4, wherein said isolation device is an optical coupler.

6. The circuit as claimed in claim 1, wherein said microcomputer outputs a the DPMS mode signal as a first waveform when the determined DPMS mode is one of a normal mode and a standby mode and outputs the DPMS mode signal as a second waveform when the determined DPMS mode is one of a suspend mode and a power-off mode.

7. The circuit as claimed in claim 1, wherein said microcomputer has at least two output ports to output the DPMS mode signal so as to provide at least three different frequencies of the oscillation signal.

8. The circuit as claimed in claim 2, wherein said microcomputer has at least two output ports connected to ones of said plurality of frequency-controlling elements, respectively, to output the DPMS mode signal so as to selectively activate said ones of said plurality of frequency-controlling elements.

9. The circuit as claimed in claim 1, wherein:
    said microcomputer comprises an internal analog-to-digital converter to output the DPMS mode signal as an analog signal; and
    said frequency controlled oscillator comprises at least one active element to output a plurality of different frequencies of the oscillation signal in accordance with the analog signal.

10. A power control circuit for use in a display device and receiving a direct current (DC), DC power and a display power management signaling (DPMS) mode signal indicative of one of a plurality of DPMS modes of the display device, the power control circuit comprising:
    a frequency-controlled oscillator to output an oscillation signal having a frequency based upon the DPMS mode signal;
    a power factor correction (PFC) controller to output a pulse width modulation (PWM) signal using said DC power, according to the oscillation signal; and
    a PFC power circuit, to generate a power-factor-corrected power output using the DC current, according to the PWM signal.

11. The power control circuit as claimed in claim 10, wherein said frequency-controlled oscillator comprises:
    an oscillator to output the oscillation signal; and
    a plurality of passive elements, connected to the oscillator, at least one of which is selectively enabled according to the DPMS mode signal, to vary the frequency of the oscillation signal.

12. The power control circuit as claimed in claim 11, further comprising:
    a processing circuit to determine the one DPMS mode and output the DPMS mode signal according to a horizontal sync signal and a vertical sync signal received from an external source;
    wherein said frequency-controlled oscillator further comprises an isolation circuit connected between the processing circuit and the at least one passive element, to prevent stray capacitance between the processing circuit and the at least one passive element.

13. The power control circuit as claimed in claim 10, wherein said frequency-controlled oscillator comprises:
an oscillator to output the oscillation signal; and
an active element connected to the oscillator, to vary the frequency of the oscillation signal according to the DPMS mode signal.

14. The power control circuit as claimed in claim 13, further comprising:
a processing circuit to determine the one DPMS mode and output the DPMS mode signal according to a horizontal sync signal and a vertical sync signal received from an external source, the processing circuit having an internal digital-to-analog converter to output the DPMS mode signal as an analog signal;
wherein the active element is a varacter diode connected to the oscillator, to vary the frequency and a duty ratio of the oscillation signal according to the analog DPMS mode signal.

15. A power control circuit for use in a display device and receiving a direct current (DC), DC power and a display power management signaling (DPMS) mode signal indicative of one of a plurality of DPMS modes of the display device, the power control circuit comprising:
a control circuit to generate a control signal based upon the DPMS mode signal;
a power factor correction (PFC) controller to output a pulse width modulation (PWM) signal using said DC power, according to the control signal, in a number of the plurality of DPMS modes;
a PFC power circuit, to generate a power-factor-corrected power output using the DC current, according to the PWM signal, in each of the number of the plurality of DPMS modes; and
a rectifier to generate the DC power and DC current and connected directly to the PFC controller and PFC power circuit;
wherein the control circuit comprises
a microcomputer to determine the one DPMS mode and output the DPMS mode signal according to a horizontal sync signal and a vertical sync signal received from an external source, and
a frequency-controlled oscillator to output the control signal as an oscillation signal having a frequency based upon the DPMS mode signal,
the oscillation signal varying a frequency of the PWM signal output from the PFC controller.

16. A power control circuit for use in a display device, comprising:
a processing circuit to determine a display power management signaling (DPMS) mode of the display device by discriminating a sync signal input from an external source, to generate a DPMS mode signal;
a rectifier to output DC power and a DC current by rectifying an AC power input;
a control circuit to generate a control signal based upon the DPMS mode signal;
a power factor correction (PFC) controller connected to said rectifier, to receive the control signal in a plurality of DPMS modes, to output a pulse width modulation (PWM) signal using said DC power according to the control signal; and
a PFC power circuit connected to said rectifier, to generate a power-factor-corrected power output using the DC current according to the PWM signal, in the plurality of DPMS modes,
wherein said control circuit comprises a frequency-controlled oscillator to output the control signal as an oscillation signal having a frequency based upon the DPMS mode signal, to adjust a frequency of the PWM signal.

17. A power control circuit for use in a display device and receiving a direct current (DC), DC power and a display power management signaling (DPMS) mode signal indicative of one of a plurality of DPMS modes of the display device, the power control circuit comprising:
a frequency-controlled oscillator to output an oscillation signal having a frequency based upon the DPMS mode signal;
a power factor correction (PFC) controller to output a pulse width modulation (PWM) signal using said DC power, according to the oscillation signal, even when the DPMS mode signal is indicative of a power-savings mode of the display device; and
a PFC power circuit, to generate a power-factor-corrected power output using the DC current, according to the PWM signal.

18. The power control signal as claimed in claim 17, wherein said PFC controller outputs the PWM signal even when the DPMS mode signal is indicative of a standby state, a suspend state or a power-off mode.

* * * * *